(12) United States Patent
Miller et al.

(10) Patent No.: US 10,983,958 B1
(45) Date of Patent: *Apr. 20, 2021

(54) SUSTAINABLE ENERGY TRACKING SYSTEM UTILIZING BLOCKCHAIN TECHNOLOGY AND MERKLE TREE HASHING STRUCTURE

(71) Applicant: ClearTrace Technologies, Inc., Austin, TX (US)

(72) Inventors: Eric Miller, Austin, TX (US); Evan Caron, Austin, TX (US); Troy Martin, Austin, TX (US)

(73) Assignee: ClearTrace Technologies, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/104,369

(22) Filed: Nov. 25, 2020

Related U.S. Application Data

(63) Continuation of application No. 17/095,438, filed on Nov. 11, 2020.

(Continued)

(51) Int. Cl.
  *G06F 16/13* (2019.01)
  *G06F 11/14* (2006.01)
  (Continued)

(52) U.S. Cl.
  CPC ........ *G06F 16/137* (2019.01); *G06F 11/1453* (2013.01); *G06Q 50/06* (2013.01); *H02S 10/12* (2014.12)

(58) Field of Classification Search
  CPC ... G06F 16/137; G06F 11/1453; G06Q 50/06; H02S 10/12
  (Continued)

(56) References Cited

U.S. PATENT DOCUMENTS

| | | |
|---|---|---|
| 4,309,569 A | 1/1982 | Merkle |
| 9,679,276 B1 | 6/2017 | Cuende |

(Continued)

FOREIGN PATENT DOCUMENTS

WO  2018032372 A1  2/2018

OTHER PUBLICATIONS

Alladi et al., "Blockchain in Smart Grids: A Review on Different Use Cases," Sensors (Basel), 2019, 19(22): 4862, Published Nov. 8, 2019, doi:10.3390/s19224862, 25 pages. (Year: 2019).*

(Continued)

*Primary Examiner* — Phuong Thao Cao
(74) *Attorney, Agent, or Firm* — Craige Thompson; Thompson Patent Law; Timothy D. Snowden

(57) ABSTRACT

Apparatus and associated methods relate to generating energy blocks on a blockchain corresponding to generation, transmission, and consumption of predetermined quanta of energy represented by corresponding records in an associated Merkle trie. In an illustrative example, individual energy data records may be hashed. Each hash may be stored in a leaf node of a Merkle trie. The individual energy data records may be aggregated to correspond to represent a predetermined quantum of energy. The individual energy data records may include energy generation records. The energy blocks may be associated with scheduling, delivery, and consumption data for the energy quantum. Various embodiments may advantageously provide secure, verifiable, and immutable tracking and processing of energy generation, transmission, and consumption of physical energy quanta across one or more distributed energy networks.

20 Claims, 8 Drawing Sheets

Related U.S. Application Data

(60) Provisional application No. 62/934,113, filed on Nov. 12, 2019.

(51) Int. Cl.
*G06Q 50/06* (2012.01)
*H02S 10/12* (2014.01)

(58) Field of Classification Search
USPC ........................................................ 707/698
See application file for complete search history.

(56) References Cited

U.S. PATENT DOCUMENTS

| | | | |
|---|---|---|---|
| 9,870,508 B1* | 1/2018 | Hodgson | G11B 27/10 |
| 10,102,265 B1 | 10/2018 | Madisetti et al. | |
| 10,496,633 B2* | 12/2019 | Pattanaik | G06F 16/2365 |
| 10,506,104 B1* | 12/2019 | Shakeri | H04M 3/42042 |
| 10,691,665 B1* | 6/2020 | Zhang | G06F 16/2264 |
| 10,691,676 B1* | 6/2020 | Zhang | G06F 16/2372 |
| 10,701,192 B1 | 6/2020 | Yang | |
| 10,831,902 B2* | 11/2020 | Black | H04L 9/3239 |
| 10,879,734 B2* | 12/2020 | Waffner | H02J 3/38 |
| 2016/0110261 A1* | 4/2016 | Parab | G06F 11/1453 707/692 |
| 2017/0206522 A1 | 7/2017 | Schiatti et al. | |
| 2017/0358041 A1 | 12/2017 | Forbes, Jr. et al. | |
| 2018/0117446 A1* | 5/2018 | Tran | A42B 3/0433 |
| 2018/0232819 A1* | 8/2018 | Stocker | G01D 4/002 |
| 2018/0299852 A1 | 10/2018 | Orsini | |
| 2018/0330349 A1* | 11/2018 | Uhr | G06Q 20/145 |
| 2018/0349706 A1* | 12/2018 | Hodgson | G11B 27/10 |
| 2019/0018888 A1* | 1/2019 | Madisetti | H04L 9/3297 |
| 2019/0086235 A1 | 3/2019 | Cui et al. | |
| 2019/0087920 A1* | 3/2019 | Cui | H04L 9/3255 |
| 2019/0089155 A1* | 3/2019 | Cui | G06Q 10/00 |
| 2019/0164236 A1 | 5/2019 | Mayne et al. | |
| 2019/0165931 A1* | 5/2019 | Bharti | H04L 67/104 |
| 2019/0214848 A1* | 7/2019 | Waffner | G05B 15/02 |
| 2019/0236726 A1* | 8/2019 | Unagami | H04L 9/30 |
| 2019/0260573 A1* | 8/2019 | Goto | H04L 9/3239 |
| 2019/0272601 A1* | 9/2019 | Unagami | G06Q 20/389 |
| 2019/0278805 A1* | 9/2019 | Li | H04L 9/3239 |
| 2019/0287200 A1* | 9/2019 | Schuler | G06Q 50/265 |
| 2019/0295193 A1 | 9/2019 | Winand et al. | |
| 2019/0325430 A1* | 10/2019 | Cui | H04L 9/3247 |
| 2019/0339678 A1* | 11/2019 | Biernat | G06F 16/248 |
| 2019/0353685 A1* | 11/2019 | Almeida Cavoto | G07F 15/003 |
| 2019/0363892 A1* | 11/2019 | Wang | H04L 9/3297 |
| 2020/0027096 A1* | 1/2020 | Cooner | H04L 67/12 |
| 2020/0042989 A1 | 2/2020 | Ramadoss et al. | |
| 2020/0057417 A1* | 2/2020 | Ping | G06Q 50/06 |
| 2020/0064783 A1* | 2/2020 | Tran | F24F 8/10 |
| 2020/0104888 A1 | 4/2020 | Obradovic et al. | |
| 2020/0106605 A1* | 4/2020 | Mord | H04L 9/3297 |
| 2020/0161858 A1* | 5/2020 | Wang | H02J 3/06 |
| 2020/0210996 A1* | 7/2020 | Edwards | G06Q 20/3678 |
| 2020/0225649 A1* | 7/2020 | Cahill | G05B 19/4183 |
| 2020/0226741 A1* | 7/2020 | Correia Villa Real | G06T 7/0004 |
| 2020/0228342 A1* | 7/2020 | Nixon | G06F 21/6218 |
| 2020/0244470 A1* | 7/2020 | Ruckriemen | H04L 9/3236 |
| 2020/0273026 A1* | 8/2020 | Soni | H04L 9/0643 |
| 2020/0274389 A1* | 8/2020 | Islam | H04L 9/0637 |
| 2020/0302533 A1* | 9/2020 | Yang | G06Q 10/06315 |
| 2020/0320055 A1* | 10/2020 | Zhang | G06F 16/2315 |
| 2020/0326679 A1* | 10/2020 | Maher | H02J 3/144 |
| 2020/0327537 A1* | 10/2020 | Garg | G06Q 20/3676 |
| 2020/0327627 A1* | 10/2020 | Chakraborty | G06F 16/27 |
| 2020/0380154 A1* | 12/2020 | Jayachandran | G06F 21/6227 |
| 2020/0389312 A1* | 12/2020 | Boneh | H04L 9/3239 |
| 2020/0394181 A1* | 12/2020 | Winarski | G06F 16/2246 |
| 2021/0042748 A1* | 2/2021 | Sepulveda | G06Q 20/36 |

OTHER PUBLICATIONS

Andoni et al., "Blockchain Technology in the Energy Sector: A Systematic Review of Challenges and Opportunities," Renewable and Sustainable Energy Reviews 100, 2019, pp. 143-174. (Year: 2019).*

Pop et al., "Blockchain-Based Scalable and Tamper-Evident Solution for Registering Energy Data," Sensors 2019, 19, 3033, doi: 10.3390/s19143033, 21 pages. (Year: 2019).*

Swiatek et al., "The Green Blockchain—Managing Decentralized Energy Production and Consumption," 2017 IEEE International Conference on Environment and Electrical Engineering and 2017 IEEE Industrial and Commercial Power Systems Europe (EEEIC/I&CPS Europe), Jun. 6-9, 2017, 5 pages. (Year: 2017).*

Anderson, Jared, Blockchain project to help JPMorgan reach 100% renewable energy goal, Jan. 14, 2020, accessed Sep. 22, 2020.

Andoni, et al, Blockchain technology in the energy sector: A systematic review of challenges and opportunities, Renewable and Sustainable Energy Reviews 100 (2019) 143-174, accessed Sep. 24, 2020, <https://www.sciencedirect.com/science/article/pii/S1364032118307184?via%3Dihub>.

Jossi, Frank, Could blockchain make it easier to buy and sell renewable energy certificates?, Apr. 17, 2020, Energy News Network, accessed Sep. 22, 2020, <https://energynews.us/2020/04/17/midwest/could-blockchain-make-it-easier-to-buy-and-sell-renewable-energy-certificates/>.

Lee, Indiana, Renewable Energy and Blockchain, Energy Central, Apr. 3, 2020, accessed Sep. 22, 2020, <https://energycentral.com/c/ee/renewable-energy-and-blockchain>.

Maisch, Marija, Australian blockchain to trace renewable energy credits for Japanese utility, Dec. 12, 2019, PV Magazine, accessed Sep. 22, 2020, <https://www.pv-magazine-australia.com/2019/12/12/australian-blockchain-to-track-renewable-energy-credits-for-japanese-utility/>.

Martell, Alex, Hop on Board the Merkle Patricia Tr(ie)an, Mar. 26, 2019, accessed Feb. 19, 2021.

Phan Son Tu, Data structure in Ethereum | Episode 2: Radix trie and Merkle trie, Feb. 8, 2018, accessed Feb. 19, 2021, <https://medium.com/coinmonks/data-structure-in-ethereum-episode-2-radix-trie-and-merkle-trie-d941d0bfd69a>.

Volt Markets, Self Upgrading Contracts in Our Platform, Volt Markets, accessed Sep. 22, 2020, <https//www.voltmarkets.com>.

* cited by examiner

SUSTAINABLE ENERGY TRACKING SYSTEM UTILIZING BLOCKCHAIN TECHNOLOGY AND MERKLE TREE HASHING STRUCTURE

CROSS-REFERENCE TO RELATED APPLICATIONS

This application is a continuation of U.S. application Ser. No. 17/095,438, titled "SUSTAINABLE ENERGY TRACKING SYSTEM UTILIZING BLOCKCHAIN TECHNOLOGY AND MERKLE TREE HASHING STRUCTURE," filed by Eric Miller, et al., on Nov. 11, 2020, which claims the benefit of U.S. Provisional Application Ser. No. 62/934,113, titled "SUSTAINABLE ENERGY TRACKING SYSTEM UTILIZING BLOCKCHAIN TECHNOLOGY AND MERKLE TREE HASHING STRUCTURE," filed by Eric Miller, et al., on Nov. 12, 2019.

This application incorporates the entire contents of the foregoing applications herein by reference.

TECHNICAL FIELD

Various embodiments relate generally to energy tracking and processing.

BACKGROUND

Mankind has implemented energy generation, transmission, and consumption in various forms throughout history. For example, ancient civilizations have long made use of both wind and water energy to grind grain. More recently, mankind has discovered practical means of generating energy at one location for transmission to and consumption at remote locations.

Energy may be generated, transferred, and consumed in various forms including, for example, electrical and chemical (e.g., petroleum-based fuels). Electrical energy may be generated, for example, by unsustainable means such as fossil fuel combustion, and by renewable means such as, for example, solar, wind, thermal, and hydroelectric generation.

Organizations and governments may, for example, implement renewable energy initiatives to encourage or require generation and consumption of renewable energy. Such initiatives may include, for example, standards for generation and use of renewable energy, rewards for progress towards full use of renewable energy, and fines associated with a failure to achieve satisfactory progress towards fully sustainable energy use. Accordingly, various entities including governments, organizations, and energy consumers may desire to record and track energy generation, transmission, and consumption data.

SUMMARY

Apparatus and associated methods relate to generating energy blocks on a blockchain corresponding to generation, transmission, and consumption of predetermined quanta of energy represented by corresponding records in an associated Merkle trie. In an illustrative example, individual energy data records may be hashed. Each hash may be stored in a leaf node of a Merkle trie. The individual energy data records may be aggregated to correspond to represent a predetermined quantum of energy. The individual energy data records may include energy generation records. The energy blocks may be associated with scheduling, delivery, and consumption data for the energy quantum. Various embodiments may advantageously provide secure, verifiable, and immutable tracking and processing of energy generation, transmission, and consumption of physical energy quanta across one or more distributed energy networks.

Various embodiments may achieve one or more advantages. For example, some embodiments may advantageously provide a technological solution to the problem in the industry of accurately and reliably tracking physical movement of energy from generation through transmission to consumption across one or more physical power distribution networks and associated data communication, processing, and control networks. Various embodiments may advantageously generate secure, immutable, verifiable digital energy data assets such as, by way of example and not limitation, blockchain tokens. Various embodiments may advantageously provide negotiable instruments representing, by way of example and not limitation, physical energy quanta, carbon intensity, environmental impact, energy efficiency, other appropriate energy-related attributes, or some combination thereof. Various embodiments may advantageously enable users to securely track and attribute sustainable energy generation and usage, such as, for example, for the beneficial purpose of powering and supporting various green energy-focused technological systems and processes (often referred to as "Green-Tech"). Various embodiments may be advantageously implemented across large-scale energy tracking and processing networks to solve existing technological problems in tracking and processing energy generation, transmission, and consumption records securely, verifiably, and immutably.

Various embodiments may advantageously generate one or more new computer outputs such as energy blocks indicative of generation, transmission, and consumption of a quantum of energy. Various embodiments may advantageously provide specific rules for solving a specific, technological problem such as, for example, implementation details including specific rules for generating, storing, and aggregating hash values, and generating and associating hash values with an associated energy block(s). Various embodiments may provide one or more new computer capabilities that did not previously exist such as, for example, a specifically recited algorithm for verifying energy generation, transmission, and consumption across at least one tracking and processing infrastructure.

Various embodiments may, for example, provide technological solutions which are infeasible and/or impossible to perform in the human mind such as, for example, generating hashes of energy data records, maintaining a Merkle trie of the hashes, aggregating multiple energy data records to represent a predetermined quantum of energy, generating energy blocks on a blockchain, and associating various data with the blocks across a tracking and processing infrastructure containing potentially disparate data sources and large amounts of digital information.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary energy tracking and processing infrastructure system for verifying energy generation, transformation, and consumption is introduced with reference to FIG. 1. Second, that introduction leads into a description with reference to FIGS. 2-3D of some exemplary embodiments of an exemplary energy tracking and processing infrastructure system. Third, with reference to FIGS. 4-5, methods for verifying energy generation, transmission, and consumption in an energy tracking and processing infrastructure system is described. Finally, the document discusses further embodiments, exemplary applications and aspects relating to verifiable energy generation, transmission, and consumption tracking.

Figure 1:
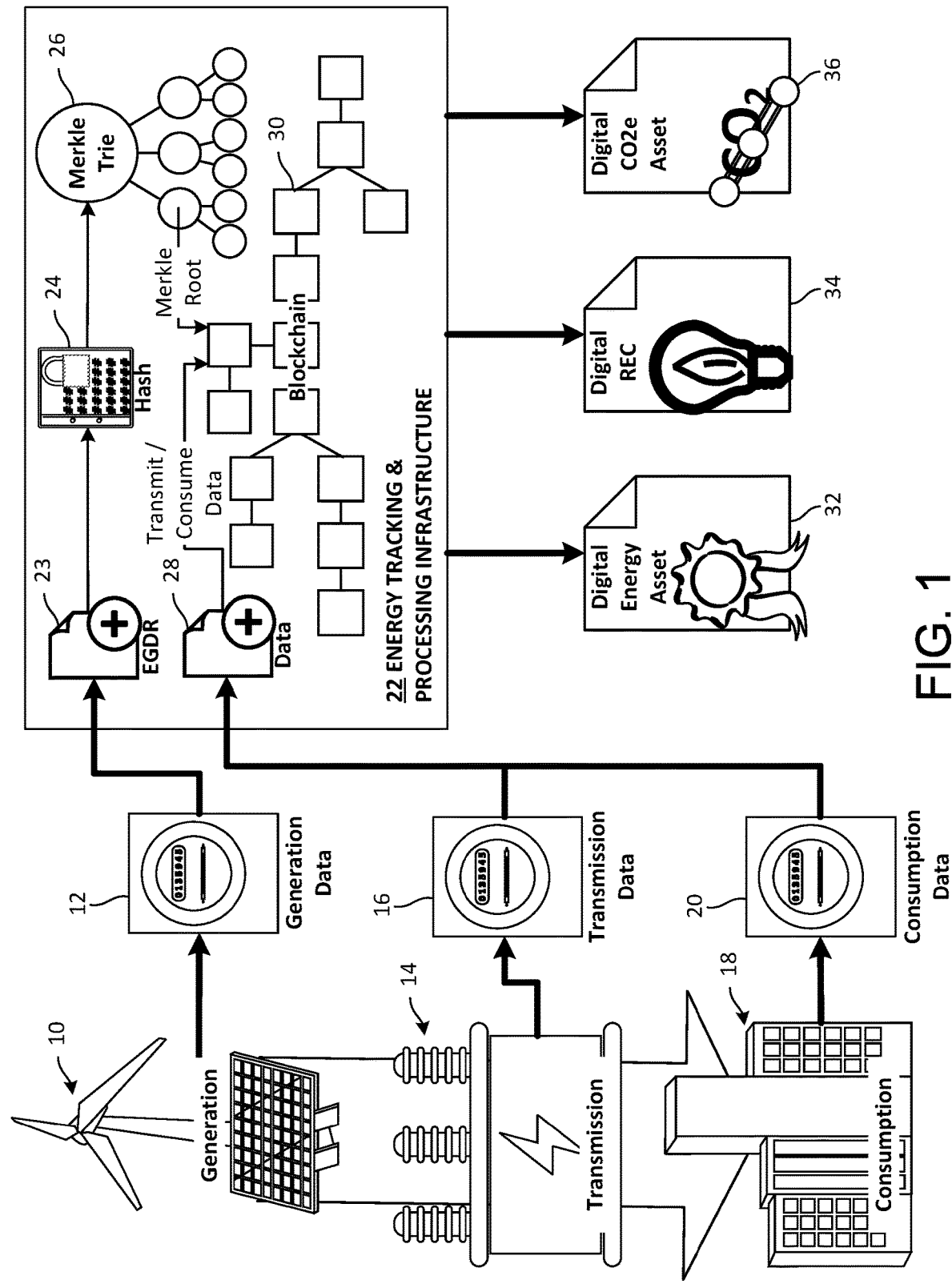
FIG. 1 depicts an exemplary energy tracking and processing infrastructure system in an illustrative use case.

FIG. 1 depicts an exemplary energy tracking and processing infrastructure system in an illustrative use case. Physical facilities for generation 10, transmission 14, and consumption 18 may be interconnected via at least one power grid. Generation data 12 is collected (e.g., by a smart meter) and transferred to an energy tracking and processing infrastructure (ETPI) 22. The ETPI 22 processes the generation data 12 to create an energy generation data record (EGDR) which is hashed 24. The hash 24 is stored in a leaf node on a Merkle trie 26. One or more leaf nodes of the Merkle trie 26 are aggregated to represent a predetermined quantum of energy (e.g., 1 megawatt-hour [MWh]). An energy block on a blockchain 30 is generated and at least one root of the Merkle trie (a hash of hashes) corresponding to the aggregated leaf nodes is recoded in the energy block. In the depicted example, transmission data 16 and consumption data 20 corresponding to that quantum of energy are collected. In various embodiments, by way of example and not limitation, transmission data may be collected, consumption data may be collected, other appropriate data, or some combination thereof. In various embodiments, no additional data may be collected. The collected data is processed into a predetermined data structure 28, and added to the blockchain (e.g., by being stored on a Merkle trie and associated Merkle root(s) being recorded to the energy block of the blockchain 30).

Data in the Merkle trie and blockchain is used to generate, process, and validate one or more digital energy asset tokens. The tokens may, for example, be generated, processed, and validated according to predetermined sets of rules corresponding, by way of example and not limitation, to digital energy data assets (32), digital renewable energy credits (34), and digital CO2e assets 36 or liabilities. Accordingly, in various embodiments, one or more ETPI may advantageously provide tracking, processing, and validation of physical energy generation, transmission (e.g., scheduling and delivery), and consumption related to particular quanta of energy. By way of example and not limitation, various embodiments may advantageously provide a technological solution for immutable, secure, and traceable records and digital assets generated therefrom for one or more attributes related to energy generation, transmission, and consumption. Attributes may include, by way of example and not limitation, renewable energy sources, renewable energy use, environmental impact, energy efficiency, or some combination thereof. Accordingly, various embodiments may, for example, advantageously provide a technological solution to the problem in the industry of accurately and reliably tracking physical movement of energy from generation through transmission to consumption across one or more physical power distribution networks and associated data communication, processing, and control networks.

Figure 2:
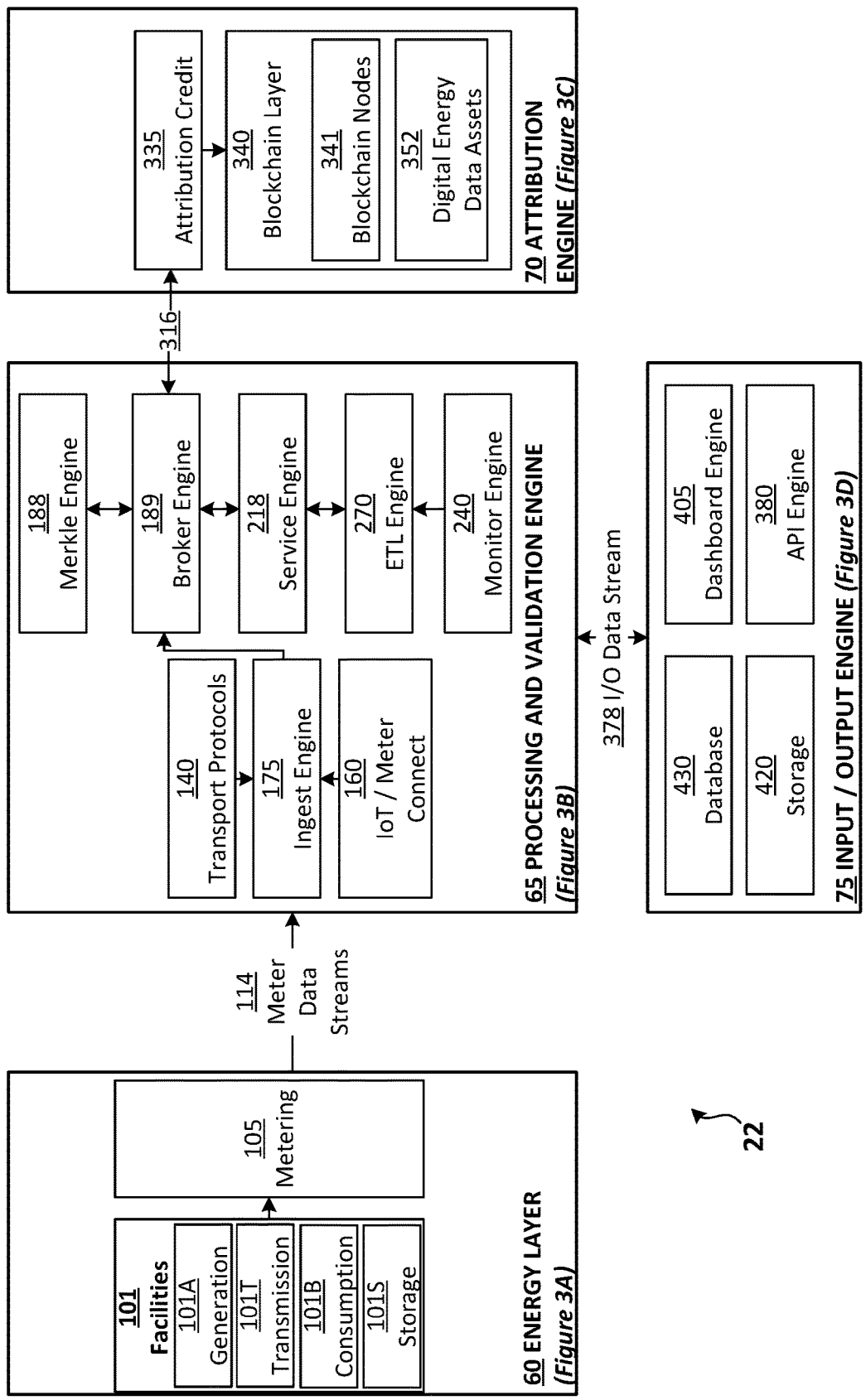
FIG. 2 depicts a block diagram of an exemplary energy tracking and processing infrastructure system.

FIG. 2 depicts a block diagram of an exemplary energy tracking and processing infrastructure system. A sustainable ETPI system 22 is a technological solution to maintain secure, traceable, and immutable records of renewable energy generation and energy consumption, at one or more energy facilities using a Merkle trie and blockchain-based architecture. More specifically, energy facilities 101 may include, as depicted: (1) a net energy generation facility 101A (e.g., wind/solar/wave farms, dams, geothermal power stations), (2) a net energy consumption facility 101B (e.g., office buildings, factories, warehouses), (3) an energy transmission facility 101T (e.g., scheduling and delivery infrastructure, substations), (4) an energy storage facility 101S (e.g., battery bank, gravity storage, inertial storage), or some combination thereof (e.g., an office building with a roof that is covered with an array of solar panels and has a battery bank in the basement, with associated transmission and scheduling equipment). Energy flow from, through, and to the various facilities 101 are measured via metering devices 105. The metering devices 105 generated corresponding data streams 114.

Data streams 114 are received by processing and validation engine 65. Processing and validation engine 65 receives meter data streams 114 via transport protocols 140 or internet of things (IoT)/meter connectors 160. The received data is processed by ingest engine 175. Ingest engine 175 provides data to a broker engine 189. Broker engine 189 exchanges data with Merkle engine 188 and service engine 218 to perform various processing, recording, and validation functions. The service engine 218 interacts with extract-transform-load (ETL) engine 270 to retrieve data from datastores through monitor engine 240. Accordingly, various embodiments may, for example, advantageously track, process, and validate physical energy generation, transmission, and consumption data.

Attribution data 316 is sent from broker engine 189 to attribution engine 70, which generates attribution credit 335. Attribution credit 335 is stored in blockchain layer 340. Blockchain layer 340 includes one or more blockchain structures having blockchain nodes 341. Smart contracts 352 are generated such as, by way of example and not limitation, renewable energy data 355, digital renewable energy credits 360, digital CO2e assets and liabilities 365, digital CO2e allowances 375, and digital energy efficiency credits 370.

Accordingly, various embodiments may, for example, advantageously generate secure, immutable, verifiable digital energy data assets such as, by way of example and not limitation, blockchain tokens. Such tokens may, for example, advantageously provide negotiable instruments representing, by way of example and not limitation, physical energy quanta, carbon intensity, environmental impact, energy efficiency, other appropriate energy-related attributes, or some combination thereof. For example, digital asset token may be used to advantageously securely track and attribute sustainable energy generation and usage, for the beneficial purpose of powering and supporting various green energy-focused technological systems and processes (often referred to as "Green-Tech").

Processing and validation engine 65 communicates with input-output (I/O) engine 75 via input-output data stream (I/O data stream) 378. I/O engine 75 includes database(s) 430, storage object(s) 420, dashboard engine 405, and API engine 380. Accordingly, various embodiments may, by way of example and not limitation, advantageously facilitate users viewing, negotiating, and verifying production, transmission, and consumption of energy quanta and digital energy data assets generated therefrom.

Figure 3A:
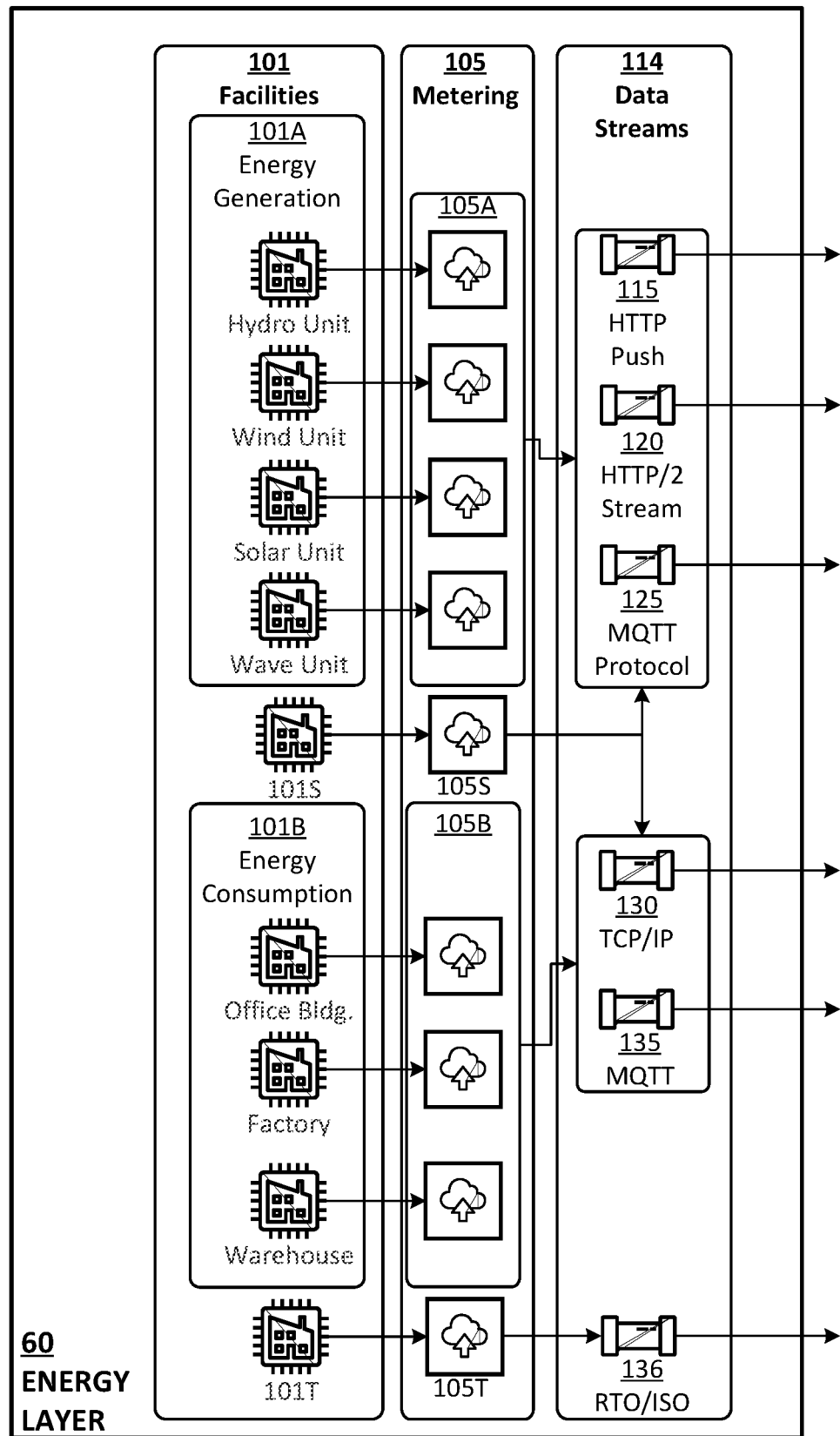
FIG. 3A depicts an exemplary energy layer providing data to an exemplary energy tracking and processing infrastructure system.

FIG. 3A depicts an exemplary energy layer providing data to an exemplary energy tracking and processing infrastructure system. Energy layer 60 includes multiple energy generating facilities 101A, energy consumption facilities 101B, energy storage facilities 101S, and energy transmission facilities 101T. Energy facilities generate energy, transmit (e.g., schedule and deliver) energy, consume energy, or some combination thereof, and may be collectively referred to as facilities 101. Exemplary generation facilities 101A depicted include, by way of example and not limitation, a hydroelectric generation facility, a wind generation facility (e.g., one or more wind turbines), a solar generation facility (e.g., one or more solar panels or heat engine (such as Stirling engine) units). Each generation facility 101A is provided with a corresponding energy generation meter 105A. Exemplary energy consumption facilities 101B depicted include, by way of example and not limitation, an office building, a factory or other industrial facility, a warehouse or other distribution or storage related facility. Each consumption facility 101B is provided with at least one corresponding energy consumption meter 105B.

Energy storage facilities 101S are provided with corresponding energy storage meters 105S. Exemplary energy storage facilities include, by way of example and not limitation, chemical energy storage facilities, thermal energy storage facilities, gravitational energy storage facilities, and inertial energy storage facilities. In various embodiments a storage meter 105S may, for example, operate as a combination generation and consumption meter. By way of example and not limitation, energy quanta stored in a storage facility 101S may be processed as "consumption" data, and energy quanta retrieved from a storage facility 101S may be processed as "generation" data.

Energy transmission facilities 101T are provided with corresponding energy transmission meters 105T. Exemplary energy transmission facilities include, by way of example and not limitation, electrical receiving and distribution stations and sub-stations, transformers, converters, and other components of scheduling and delivery facilities and networks including computer-based negotiation and distribution networks. Transmission meters 105T may include, by way of example and not limitation, physical meters as well as individual or networked digital scheduling and delivery record generation and processing devices (e.g., system operation and transmission organization control networks). Data stream 136 may include data transmitted from regional transmission organizations (RTOs) and independent system operators (ISOs).

In various embodiments, a single physical facility may operate as one or more types of energy facility (e.g., an energy generation facility may also consume energy, an energy consumption facility may include generation and storage facilities, as well as other appropriate configurations). In various embodiments, a single meter may operate in multiple metering modes to generate data related to a combination of energy generation, transmission, and consumption data.

Each energy metering device 105 may be operably configured as a networked or Internet of Things (IoT) device, such that each metering device 105 may operate as a "smart" meter that is capable of transmitting energy generation and/or consumption data to a processing and validation engine 65 of an ETPI 22. The metering devices 105 generate data streams 114. The data streams 114 may be in various forms. Data streams 114 may include, by way of example and not limitation, hypertext transport protocol (HTTP) push 115, HTTP/2 stream 120, message queueing telemetry transport (MQTT) protocol 125 (e.g., commonly used for IoT devices), transmission control protocol/internet protocol (TCP/IP) 130, MQTT 135, other appropriate forms, or some combination thereof. Although exemplary data stream formats are depicted, other forms are contemplated including, but not limited to, modbus, Apple Talk transaction protocol, fiber channel protocol, IL protocol, reliable data protocol, stream control transmission protocol, sequenced packet exchange, structured stream transport, micro transport protocol, other appropriate data stream formats, or some combination thereof. Accordingly, in various embodiments data streams of generation, transmission, and consumption data for energy quanta may be advantageously collected and transmitted for tracking, processing, and verification, and generation of digital assets related thereto.

Figure 3B:
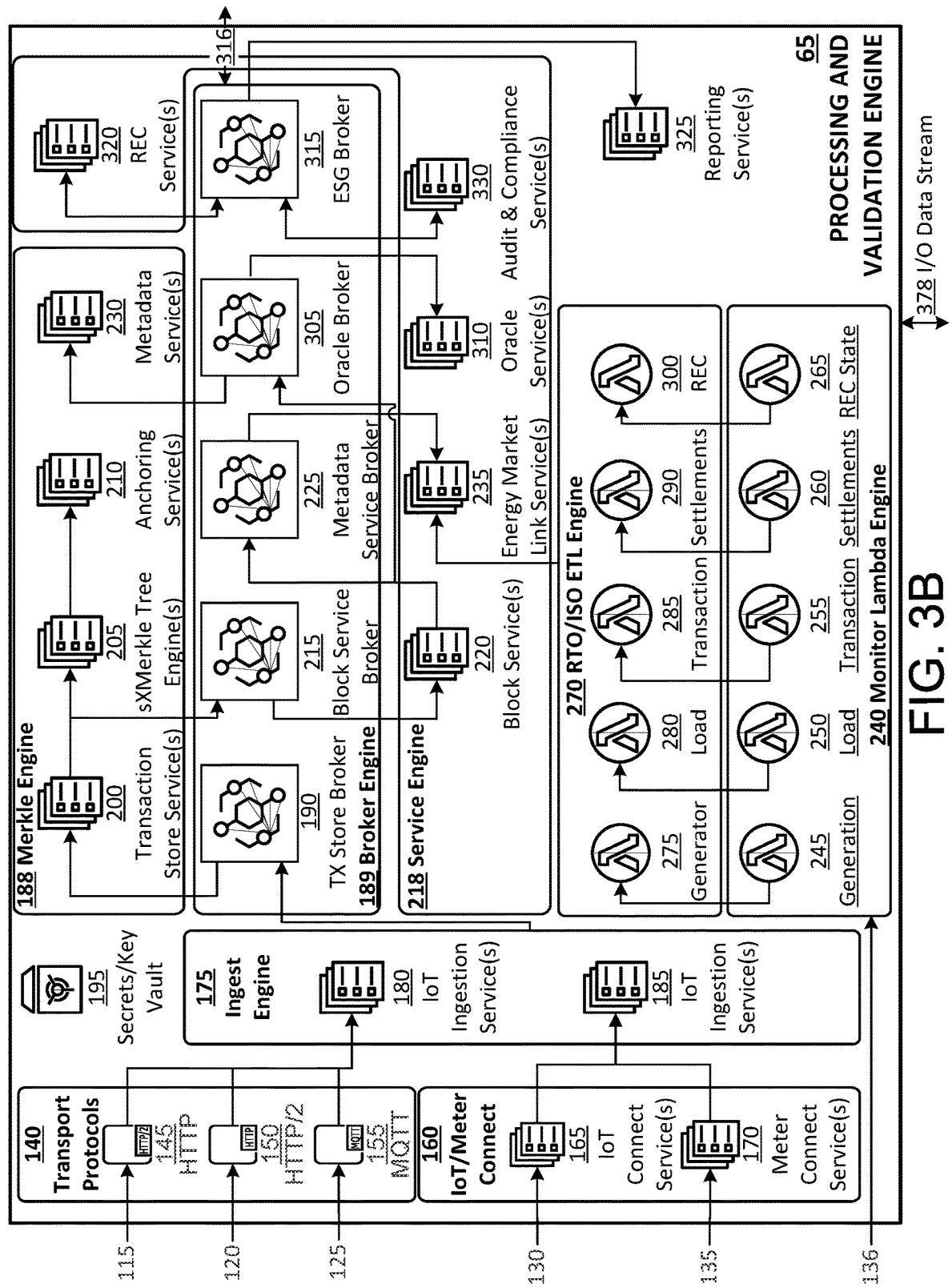
FIG. 3B depicts an exemplary processing and validation engine receiving data from the exemplary energy layer of FIG. 3A.

FIG. 3B depicts an exemplary processing and validation engine receiving data from the exemplary energy layer of FIG. 3A. The processing and validation engine 65 are operably coupled to and configured to receive data from energy layer 60 via transport protocols 140 and IoT/Meter Connect services 160. By way of example and not limitation, HTTP push data streams 115 are processed via HTTP Protocols 145, HTTP/2 streams 120 are processed by HTTP/2 Protocols 150, and MQTT streams 125 are processed by MQTT protocol 155. Similarly, TCP/IP data streams 130 are processed by IoT connect services 165, and MQTT data streams 135 are processed by meter connect services 170. In various embodiments, each metering device 105 may be pre-configured to transmit energy data to the Transport Protocols 140 and IOT/Meter Connect 160 at regular (or semi-regular) intervals. Various metering devices may, for example, transmit data at differing time intervals (e.g., a first metering device may transmit every 5 minutes, a second metering device may transmit once an hour, a third metering device may transmit once a day). Similarly, various metering devices may, by way of example and not limitation, transmit when a predetermined quanta of energy is reached (e.g., 1 kilowatt-hour). The energy data transmitted to the Transport Protocols 140 and IOT/Meter Connect 160 may include device static data (e.g., device serial number, manufacturer, installer, installation date, permission to operate date, geo-location credentials (lat/long), device streaming data (power output), energy output, inverter output, etc.), or some combination thereof. In at least one example, a given metering device 105 may transmit meter power readings to the transport protocols 140 and IOT/Meter Connect 160.

Incoming energy generation, transmission, and consumption data, once processed by transport protocols 140 or IoT/Meter Connect 160, is then processed by ingest engine 175. Ingestion service(s) 180 is operably coupled to and configured to process data from transport protocols 140. IoT ingestions service(s) 185 is operably coupled to and configured to process data from IoT/Meter connect service(s) 160. At least some portion of ingestion engine 175 may be implemented as a function-as-a-service, utilizing serverless functions in cloud computing systems that executes extract-transform-load (ETL) operations to transform data from various data sources (e.g., various metering devices 105) into one or more predetermined data structures for use by processing and validation engine 65. The ingest engine 175 may also perform various data normalization operations to normalize the received energy data, by way of example and not limitation, into a standardized and easy-to-use format.

Ingest engine 175 may transmit the normalized energy data to, and load the data into, a transaction (TX) store broker 190 of broker engine 189. In various implementations the transaction store broker 190 may be implemented, for example, as a cloud queue service that runs on multiple servers, including virtual machines. In various examples, some secret and sensitive data or other private info is stored in at least one secrets/key vault 195.

In various embodiments, once an individual energy data record reaches a top of a queue in transaction store broker 190, the broker 190 transmits the currently queued-up energy data record to transaction store service 200 in Merkle engine 188. The transaction store service 200 may be implemented, by way of example and not limitation, as a cloud container instance in some embodiments. The transaction store service 200 is configured to receive an energy data record (representing a specific unit of energy) transmitted from the broker 190, identify the source of the energy data record (e.g., whether it originated from a specific energy generation facility 101A, a specific consumption facility 101B), and perform validation operations on the energy data record. The transaction store service 200 is also configured to hash the record (e.g., using one or more secure hash algorithm (SHA), message digest (MD, such as MD5), BLAKE (such as BLAKE3), and other appropriate hashing and hash functions) to create a hash "signature" of the record. In various embodiments, the transaction store service 200 may function as a deduplication engine to deduplicate messages (e.g., messages received from the same source for an identical time and energy value).

The hash of the specific energy record is stored in a Merkle tree structure, which may be implemented as a DBaaS, in some examples. Specifically, in various embodiments, the Merkle tree may specifically be implemented as a Merkle trie structure. The record itself may be stored in a suitable datastore such as, by way of example and not limitation, a Merkle tree, a database, other appropriate datastore structure, or some combination thereof. The hash of the specific energy record, along with the record itself, may also be stored in a separate database, as well. A Merkle (or hash) trie is an immutable data structure, arranged as a tree in which leaf nodes are labelled with the hash of a data block, and non-leaf nodes are labelled with a cryptographic hash of the labels of its associated child nodes.

As applied herein, individual source energy data records/entries are placed into the tree in an order. The order in which entries are inserted into the Merkle trie may cause different tree structures, even for the same underlying collection of entries (which may function as an "audit trail" for security and verification). The transaction store service 200 (which may be a tree microservice) may record the order in which the entries are placed into the tree, as well as the associated energy record hash that changed the state of the tree resulting in a new Merkle root. In various embodiments, one or more Merkle tries are specifically configured and operably coupled to various engine(s) and service(s) to store hashes of energy data records (e.g., energy generation data record(s), also referred to as EGDRs). Such Merkle tries may, for example, not store information relating to state, including blockchain record states, but instead store at least a hash of the information itself.

The integrity, state and health of the foundational tree are maintained by Merkle tree engine 205 (which may be configured to maintain various types of Merkle trees including, by way of example and not limitation, Merkle tries). In addition, the Merkle tree anchoring service 210 (which may be configured to administer various types of Merkle trees including, by way of example and not limitation, Merkle tries) stores the latest Merkle tree (or trie) root on at least one blockchain. In various embodiments, this anchoring service 210 may, by way of example and not limitation, run at the end of every hour or at another other appropriate predetermined or dynamic time interval(s). A smart contract may, for example, be created to allow simple interaction in which a user can query by time to get at least one Merkle root which can then be used to validate Merkle proofs and audit energy. The transaction store service 200 is further configured to queue up a request to the block service broker 215. Block service broker 215 may, for example, be implemented as a cloud queue storage, in various examples. The block service broker 215 feeds into the block service 220 of service engine 218.

The block service 220 executes aggregation operations to aggregate individual energy data records to generate a block according to a predetermined block type or block size. Accordingly, for example, the system may request data from device 105A for 12 PM on Oct. 31, 2019, and with the hashing functionality, create an hour block of energy, that is a hash of hashes (Merkle trie). Similarly, the system may receive a plurality of EGDRs from a generation metering device 105A, hash the individual records (each representing a quantity of energy generated over a duration in time) and store them on individual leaf nodes in the Merkle trie, and then aggregate the individual records and generate a corresponding energy block representing a predetermined quantum of energy (e.g., 1 MWh). Accordingly, easily transferrable and verifiable energy blocks may be generated corresponding to discrete energy quanta and validated by individual hashed energy data stored at least in a Merkle trie.

With this discrete energy block of data consolidated and all necessary energy records compiled, the block service 220 then interfaces with metadata service broker 225 and metadata service(s) 230, as well as with oracle broker 305. The metadata service(s) 230 enriches the data in the block service 220 with various metadata (e.g., time and location-specific grid emission factor, weather data and various other environmental data). In addition, metadata service 230 interfaces with energy market link services 235. The metadata service 230 is dynamic. As the use of the technology becomes more prolific, the metadata service 230 may, for example, be expanded to incorporate metadata elements not yet requested.

Energy market link services 235 uses data retrieved by monitor lambda engine 240 and regional transmission organization and independent system operator (RTO/ISO) ETL engine 270. Monitor lambda engine 240 receives data streams 136 from transmission facilities 101T. Monitor lambda engine 240 includes generation schedule monitor 245, which may monitor an energy generator's bid and commitment schedule and extract any new data. This may be done, for example, for the day-ahead and hour-ahead markets. Load monitor 250 may monitor load serving and load bus details and extract new data therefrom. Transaction monitor 255 may monitor a generator's internal bilateral transactions (IBT's) and transaction contracts and extracts any new data. Settlements monitor 260 may monitor load serving entities for settled meter data used for reconciliations. REC state monitor 265 may monitor RECs for any changes and alerts when changes are found.

RTO/ISO ETL engine 270 may extract data retrieved by monitor lambda engine 240 and transform it into at least one predetermined data form. Generator ETL 275 may extract generator information from the ISO/RTO marketplace. Load ETL 280 may extract the load serving and load bus details from the ISO/RTO marketplace. Transaction ETL 285 may extract the generation schedule, transaction schedules, and IBT's from the ISO/RTO marketplace. Settlements ETL 290 may, for example, extract settlement data from the ISO/RTO marketplace(s). REC ETL 300 extracts REC status information from one or more ISO REC systems. The energy market link service 235 and associated ETL tasks and lambda functions may form an important aspect of the system by combining the energy metering device data 105 with RTO/ISO physical scheduling data which proves the physical path the data electron "traveled" from the time and location of its generation to its delivery and consumption.

Once the block service 220 is finished aggregating a given block and the metadata service 230 is complete enriching a given block, the block is then transmitted to an oracle engine (which includes oracle broker 305 and oracle service 310). The oracle service 310 may be configured, for example, to calculate the CO2e asset (e.g. the block contains renewable energy generation data) or liability (e.g. the block contains energy consumption data) which is the product of renewable energy produced and a relevant grid emission factor, or the product of energy consumed and a relevant grid emission factor. The oracle service 310 may, for example, be dynamic.

Exemplary ETPI 22 embodies leading edge technology as discussed herein, as well as an array of reporting services. For example, environmental, social, and governance (ESG) broker 315 facilitates three standard services: renewable energy credit (REC) service 320, audit and compliance service 330, and reporting service 325. REC service 320 is a block service that counts and assembles net energy generation facility 101A individual data points up to 1 MWh. All hashes can be matched to attributions once generated by the oracle engine downstream. The REC service 320 matches hashes to attributions and prevents double counting. These RECs are processed as a digital asset 316 onto a blockchain via broker engine 189. This service may also orchestrate and automate a digital twin process in the RTO/ISO REC systems. Any automatic transfer of RECs from generator to customer may also be handled by this service. Audit & compliance service 330, in coordination with corporate ESG programs, models, may measure and provide the basis for auditing and reporting an organization's ESG impact and performance. Reporting service 325 generates and curates meaningful and insightful reports around, by way of example and not limitation, ESG compliance goals and Scope 2 emissions. Accordingly, in various embodiments, energy generation, transmission, and consumption data may be advantageously transformed into secure, verifiable, and actionable data records associated with predetermined physical energy quanta. Furthermore, immutable, verifiable, traceable, and negotiable digital energy data assets may be generated therefrom.

Figure 3C:
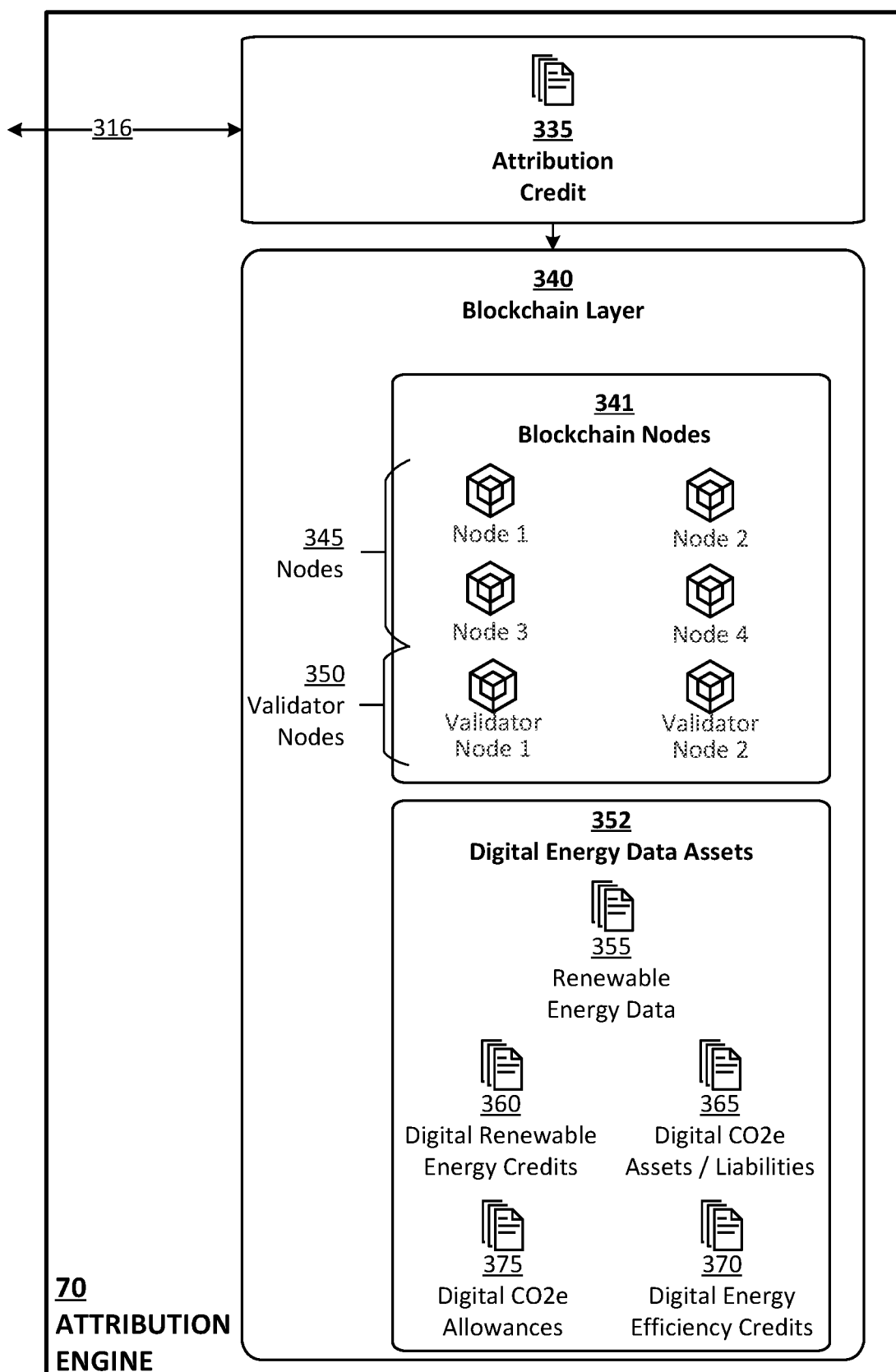
FIG. 3C depicts an exemplary attribution engine of the exemplary processing and validation engine of FIG. 3B.

FIG. 3C depicts an exemplary attribution engine of the exemplary processing and validation engine of FIG. 3B. Once oracle service 310 has processed a specific block of data it then generates an energy attribution credit 335. In the depicted example, the attribution credit 335 is the origin of five distinct digital assets: digital renewable energy data 355, digital RECs 360, digital CO2e assets or liabilities 365, digital CO2e allowances 375, and digital energy efficiency credits 370. Digital renewable energy data 355 may, for example, advantageously enable accelerated settlement of purchased energy via transfer of digital currency between parties. Digital RECs 360 are digital renewable energy data assets aggregated into bundles representing discrete predetermined energy quanta (e.g., 1 MWh). Digital RECs may, for example, advantageously be used directly by a user for internal purposes, or be used for third-party exchange.

Digital CO2e assets or liabilities 365 may represent a predetermined site-specific measure of carbon benefit or burden. These digital CO2e assets/liabilities 365 may advantageously, by way of example and not limitation, enable internal attestations, such as with respect to carbon neutrality or intensity, and may serve as the starting point for energy consuming facilities for the creation of digital energy efficiency credits 370. Digital energy efficiency credits 370 may represent a calculated difference between the measured carbon intensity of a consumption site versus mandated thresholds (for example, carbon intensity in excess of mandated thresholds are liabilities, and intensity measures below mandated thresholds are assets). The digital energy efficiency credits 370 may, by way of example and not limitation, advantageously be used internally across a registrant's portfolio, and may be available for third-party exchange.

Digital CO2e allowances 375 are carbon assets which may, by way of example and not limitation, be the result of various measures using: Measured Energy Consumption Pre-Action, Energy Reduction Action Taken, and Measured Energy Consumption Post-Action resulting in an observed and determinable measure of energy reduction that result directly from, for example, the Energy Reduction Act. The digital CO2e allowances 375 may be determined according to predetermined energy quanta such as, for example, in 1 MWh increments. The measures, when multiplied by the relevant grid emission factor, result in a digital CO2e allowance 375 which may, for example, be advantageously used for third-party exchange. Each digital energy asset token referred to herein may contain various data parameters including, by way of example and not limitation, the block type, validation data, input data, energy used (e.g., in MWh), and carbon footprint (e.g., in lbs.), as well as the raw data used to derive these values.

In various embodiments, the rate of digital RECs 360 and digital energy efficiency credits 370 generated may often be dependent on the level of energy a given facility 101A/B is using, generating, or transmitting. For example, a small array of solar panels on top of an office building may take several days to produce a single REC 360, while a large wind farm on hundreds of acres of land may generate multiple RECs 360 in an hour timespan.

In various examples, various queues, services, and instances (e.g., 190, 200, 215, 220, 225, 230, 305 and 310) may run on a single cloud-hosted virtual machine as elastic container service clusters. Various function services may be run as an array of virtual machines, which may be supplied in one or more on-demand cloud computing service.

A blockchain record may be generated in blockchain layer 340 for each digital energy data asset 352. In the depicted example, blockchain layer 341 includes nodes 345 and validator nodes 350. Nodes 345 are original layers of blockchain processing. Validator nodes 350 may, for example, be third-party hosted-nodes configured to run in parallel with nodes 345 as an independent check of the nodes 345. The digital energy data assets 352 may, by way of example and not limitation, be stored in blockchain wallets, such as wallets for digital renewable energy data 355, digital RECs 360, digital CO2e assets or liabilities 365, digital CO2e allowances 375, and digital energy efficiency credits 370. Each block in blockchain layer 340 may be a blockchain-verifiable record that may, for example, advantageously be used to securely track energy generation, transmission, and usage (e.g., of renewable/sustainable energy) for a wide variety of energy generation, transmission, and consumption sites and facilities.

In various embodiments, different forms of blockchain technology may be used. For example, the registrant at a facility 101A may desire to use Bitcoin-type blockchain architecture, while the registrant at a facility 101B may prefer to use an Ethereum-based blockchain architecture. In this sense, various systems and methods disclosed herein may be referred to as "blockchain-agnostic." Various embodiments may, for example, use a privately-implemented blockchain network for tracking, tracing, and attributing sustainable energy generation, transmission, and consumption that may be configured, by way of example and not limitation, with a (low-latency) proof of authority or proof of work (consensus) algorithm/node structure. Various data in the network may originate from a proprietary source.

Figure 3D:
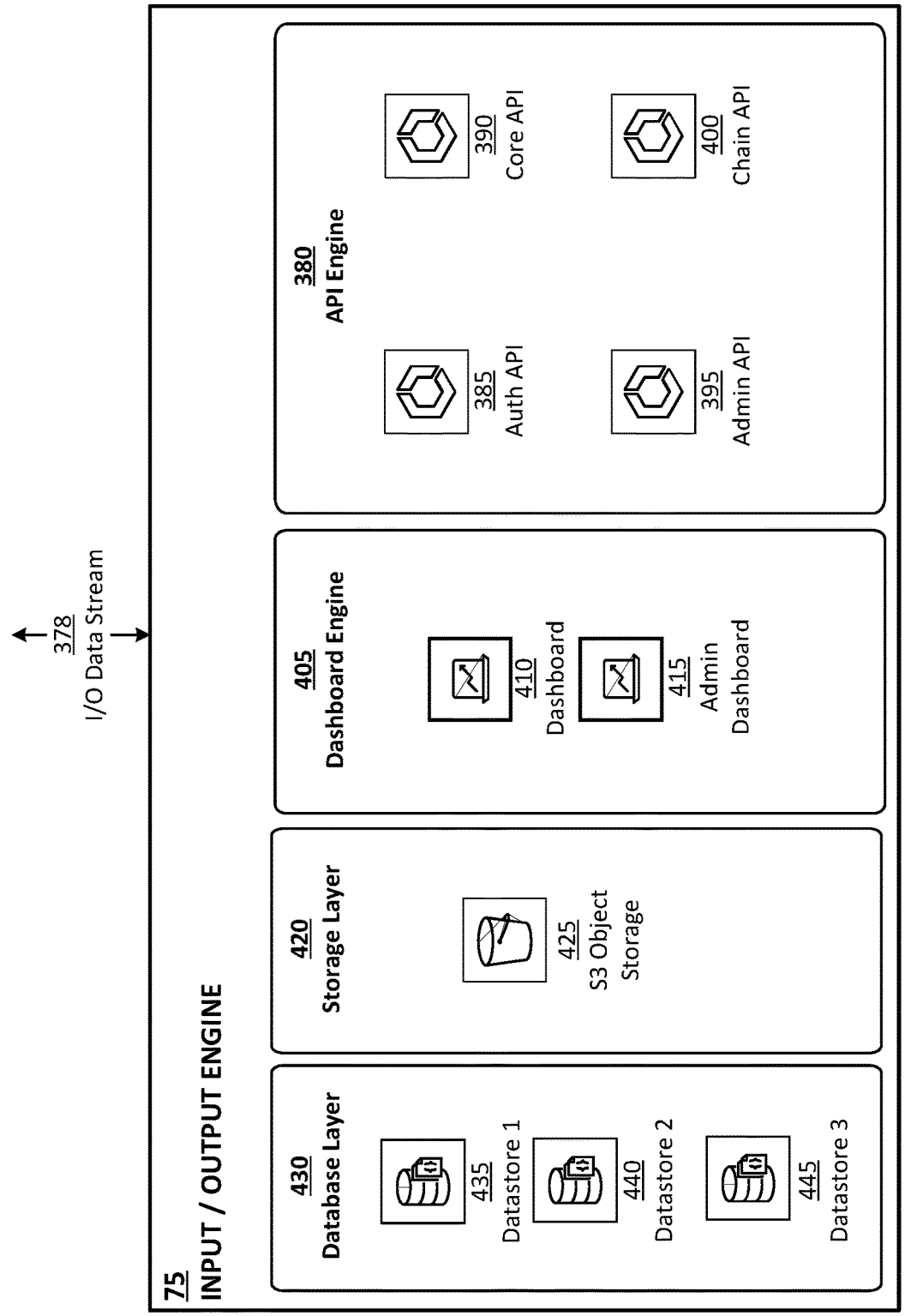
FIG. 3D depicts an exemplary input/output engine of the exemplary processing and validation engine of FIG. 3B.

FIG. 3D depicts an exemplary input/output engine of the exemplary processing and validation engine of FIG. 3B. Various embodiments may employ various elements of an input/output engine. In the depicted ETPI 22, input/output (I/O) engine 75 communicates with processing and validation engine 65 via I/O data stream 378. In the depicted EPTI 22, IO engine 75 includes an application programming interface (API) engine 380, as well as a dashboard engine 405.

API engine 380 provides multiple functions including, but not limited to, user authorization (Auth API 385), core data retrieval services (Core API 390), and administrative functions (Admin API 395). Chain API (140) is an API endpoint to get blockchain transactions generated from different digital assets and other smart contracts. In various embodiments, making these transactions available through request calls may advantageously enable a callback to return information about a transaction of a specific smart contract or digital asset which holds metadata contents of meters queried from one or more associated database.

Dashboard engine 405 includes a set of graphical user interfaces (GUIs), including Dashboard 410 and Admin Dashboard 415 which may, for example, enable registrants to view and configure, respectively, registered facilities 101. In various embodiments, using hashes of hashes for source energy tracking and attribution may, for example, advantageously ensure that digital renewable energy data 355, digital RECs 360, digital CO2e assets or liabilities 365, digital CO2e allowances 375, and digital energy efficiency credits 370 are secure, genuine, and untampered with. For example, if an audit of a blockchain transaction indicates that certain hash values are not equivalent, then such a mismatch may be a strong indication that the transaction has been tampered with, and should therefore be marked as a suspect or invalid transaction.

Figure 4:
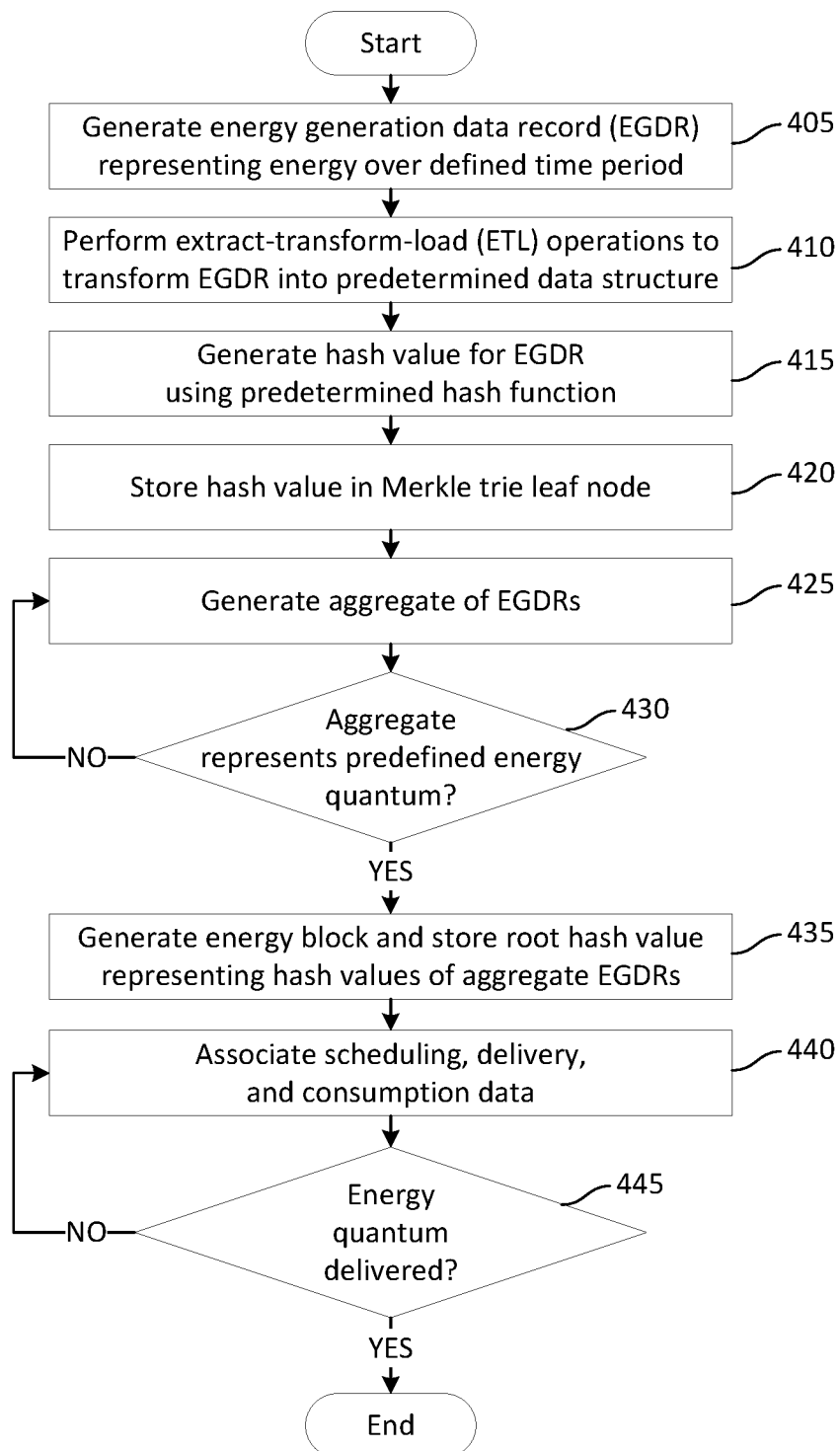
FIG. 4 depicts an exemplary method to verify energy generation, transmission, and consumption across an energy verification and tracking infrastructure.

FIG. 4 depicts an exemplary method to verify energy generation, transmission, and consumption across an energy verification and tracking infrastructure. In the depicted method, an EGDR may be generated 405 using data, for example, from an energy generation facility. The EGDR represents a physical quantity of energy generated over a defined time period. ETL operations are performed 410 on EGDR to transform the EGDR into a predetermined data structure such as, for example, by processing and validation engine 65 of FIG. 3B. The resulting data structure is processed through a predetermined hashing function to generate 415 a hash value representing the EGDR. This hash value is stored 420 in a Merkle trie leaf node. In various embodiments, the leaf node may be pre-existing, or may be generated for the new hash value according to a predetermined tree structure. In various embodiments, each leaf node may contain a single hash value representing a single EGDR.

An aggregate of EGDRs (e.g., by aggregating leaf nodes, which may be performed by taking two time-separated Merkle trie roots representing multiple added EGDRs) is generated 425. If the aggregate does not correspond 430 to a predefined energy quantum (e.g., 1 MWh), then more records are added to the aggregate until the predetermined energy quantum is achieved 430. The aggregated records (e.g., represented by at least one Merkle trie root) is used to generate 435 an energy block, and a corresponding root hash value is stored therein representing the hash values of the aggregated EGDRs.

The energy block generated in step 435 is subsequently enriched by associating 440 scheduling, delivery, and consumption data. By way of example and not limitation, the associated consumption data, for example, may represent energy consumption data record(s) (ECDR(s)). ECDRs may, similar to EGDRs as described in relation to FIG. 4, be transformed according to a predetermined data structure, hashed, stored in a Merkle trie (which may, by way of example and not limitation, be the same Merkle trie as the EGDRs are stored on or a separate Merkle trie), and used to generated digital energy asset tokens. The resultant consumption-related tokens may be associated, for example, with generation data (e.g., EGDRs or energy generation block(s) generated therefrom). Consumption-related tokens may, for example, be associated with correlated energy generation block(s) by an identifying hash or other identifier with the energy block. Similarly, transmission (e.g., scheduling and delivery data) data may be similarly hashed and stored, or may be associated (e.g., as metadata) with corresponding energy blocks.

If an energy quantum is delivered, the exemplary process is considered complete, because the energy quantum has been tracked from generation through transmission to consumption. Otherwise, transmission and consumption data continues to be monitored and associated 440 with the energy block representing the associated physical energy quanta. Accordingly, various embodiments may advantageously provide secure and verifiable tracking and processing of energy quanta generation, transmission, and consumption using energy blocks on one or more blockchains validated by traceable Merkle trie records.

Figure 5:
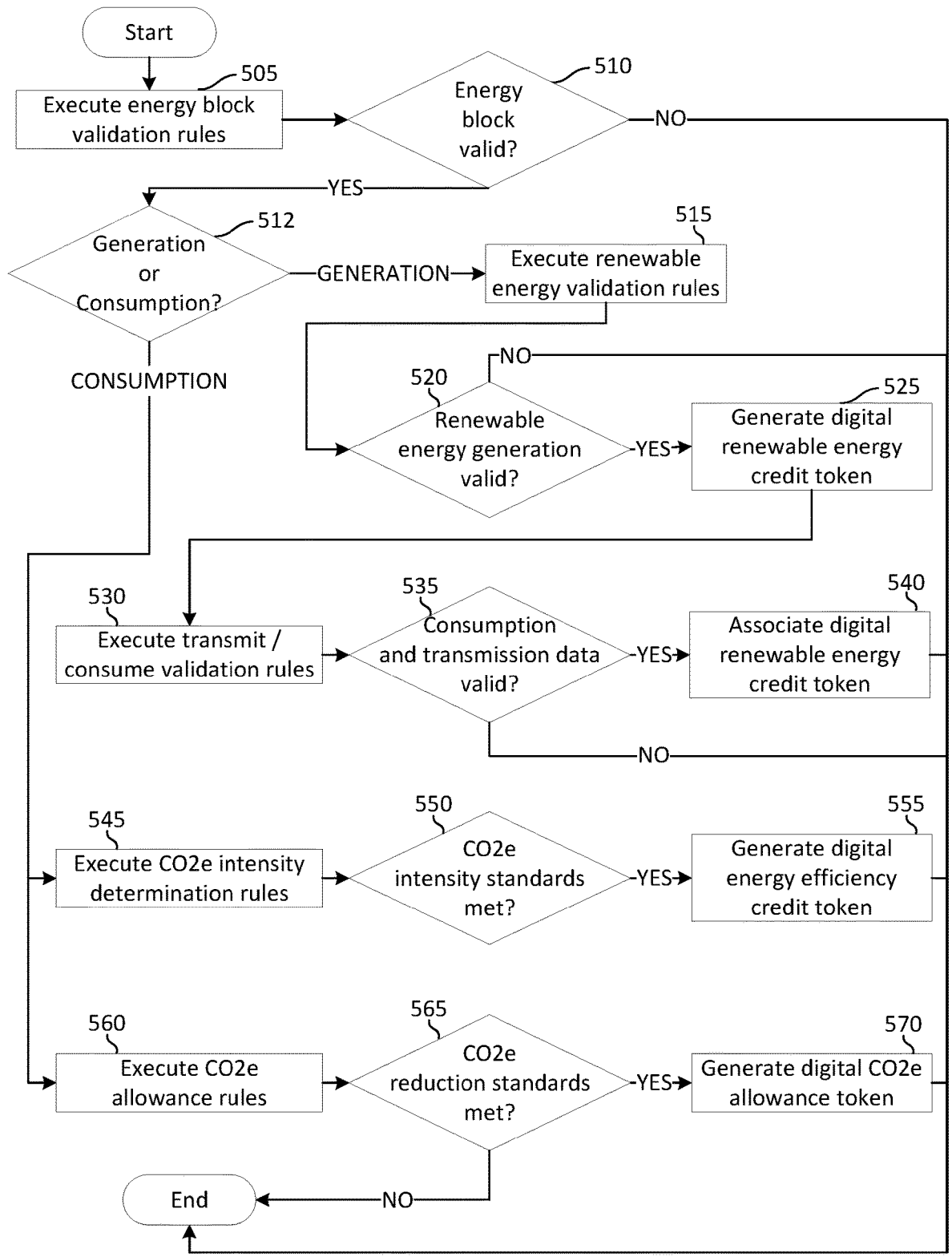
FIG. 5 depicts an exemplary method to generate digital asset tokens from energy generation, transmission, and consumption data.

FIG. 5 depicts an exemplary method to generate digital asset tokens from energy generation, transmission, and consumption data. Predetermined energy block validation rules are executed 505 on a pre-existing energy block. If the energy block is not valid 510, the process ends. If the block is valid 510, the next step determines 512 whether the energy block is an energy generation block or energy consumption block. If the energy block is generation data (such as, for example, an energy generation block generated according to the exemplary method of FIG. 4), predetermined renewable energy validation rules 515 are executed, such as discussed in relation to FIGS. 3A-3D. If the rules validate that the energy block represents valid renewable energy generated 520, a digital renewable energy credit token is generated 525. Otherwise, the process ends.

Predetermined transmission and consumption validation rules 530 are executed on the energy block representing validated digital renewable energy consumed by a facility. If the consumption and transmission data is validated 535 (e.g., that the renewable energy block is confirmed as transmitted to and consumed by a given facility), the digital renewable energy credit token is associated (or "enriched") 540 with the associated transmission and consumption data. Otherwise, the process ends.

If, at step 512, the data is determined to be consumption data, predetermined CO2e intensity determination rules 545 are executed on one or more consumed energy blocks containing verifiable data corresponding to a particular consumption facility. If the CO2e intensity standards are met 550, one or more digital energy efficiency credit tokens are generated 555. Otherwise, the process ends.

Predetermined carbon dioxide emission (CO2e) allowance rules (e.g., implementing one or more governmental mandates) are executed 560 on one or more consumed energy blocks and on further verifiable and traceable consumption facility data. If applicable CO2e reduction standards are met 565, a digital CO2e allowance token is generated 570 and the exemplary process ends. If the data is invalid (e.g., unverifiable), the exemplary process ends without generation of a digital CO2e allowance token. Accordingly, various embodiments may, by way of example and not limitation, generate secure, verifiable, traceable, and immutable digital asset tokens. The tokens may, for example, be advantageously used in implementing renewable energy initiatives such as, for example, through negotiable digital energy data assets. The digital energy data assets may advantageously be used for rewards, fines, and trading to advantageously, verifiably, and efficiently implement energy efficiency and sustainability.

Although various embodiments have been described with reference to the Figures, other embodiments are possible. For example, although various embodiments have been described with respect to energy generation, energy generation data records, and creating associated energy blocks therefrom, other embodiments are contemplated. By way of example and not limitation, energy data records may include energy generation, energy transmission (e.g., scheduling and delivery), energy consumption, or some combination thereof. In various embodiments, energy consumption records may, for example, be transformed into a predetermined data structure(s), hashed and recorded in a Merkle trie(s), aggregated into predetermined energy quanta, and energy blocks (e.g., consumption blocks or generation blocks) generated therefrom. In some embodiments, for example, both energy consumption blocks and energy generation blocks may be generated. Some energy generation blocks may be associated with ('enriched' with) energy consumption data by associating, for example, an identifier of respective energy consumption blocks corresponding to the energy quanta represented by the energy generation blocks, and vice versa for energy consumption blocks. Some energy generation/consumption blocks may not be associated with corresponding data.

For example, some energy generators, some energy consumers, or some combination thereof, may not currently produce sufficient data. Some customers may only require or permit energy consumption or energy generation data to be processed and generated. Accordingly, various embodiments may, for example, advantageously aggregate data records and generate energy blocks corresponding to only one of: energy generation, transmission, or consumption. Various embodiments may, for example, advantageously aggregate data records and generate energy blocks corresponding to some combination thereof. Various embodiments may not generate energy blocks from transmission data, but may correlate transmission data to energy generation blocks, energy consumption blocks, or some combination thereof.

In various embodiments, by way of example and not limitation, attribution records and digital energy attribution tokens may be associated with a point of generation or a point of consumption. Various embodiments may, for example, record transmission losses (e.g., conversion losses, line losses, and the like) as energy consumption. Various embodiments may, for example, implement 'energy fragment' records which may simultaneously reference two energy records. Such energy fragments may, for example, advantageously enable more accurate, fine-grained accounting for energy generation, consumption, and transmission (e.g., transmission losses).

For example, if two EGDRs are aggregated representing individual 5 minute time increments for an electricity generator producing 0.6 MW per hour, the actual energy represented may be 1.2 MWh. Rather than rounding to 1 MWh, a first energy block may be generated representing 1 MWh and associated with an aggregate of the first EGDR (0.6 MWh) and a 'fragment' of the second EGDR (representing 0.4 MWh of the 0.6 MWh of the second EGDR). The next chronological energy block may be generated representing 1 MWh and associated with an aggregate beginning with a second 'fragment' of the second EGDR (representing the remaining 0.2 MWh of the 0.6 MWh of the second EGDR).

In various embodiments, a Merkle root may provide proof of a Merkle trie over time. As leaf nodes are written or created, one or more roots change in time. Accordingly, using corresponding roots, the trie itself may be loaded, for example, at a previous state and at a current state. In various such embodiments, however, the trie, although loaded at two different 'states,' is not itself storing 'states' of another record, but is actually storing energy records.

For example, every time a new record (e.g., a new leaf node) is written to a Merkle trie, the root of the Merkle trie (a hash generated from all children nodes) is updated and altered. Accordingly, the fact that the Merkle root is changed proves that energy just added did not exist before in time. An energy block generated therefrom represent corresponding records at a point in time. By way of example and not limitation, if 12 events are aggregated and associated with a block, the corresponding Merkle root includes at least all 12 records. Accordingly, fine grain traceability and verification may be advantageously provided. Every single data point at the lowest level (individual records such as, for example, generation, transmission, and consumption from various energy meters) is represented, aggregated, and traceable. Accordingly, not only the resulting block generated is verifiable, but the underlying data records are traceable and verifiable.

By way of example and not limitation, a specific Merkle trie root may be anchored to a corresponding energy block on a block chain such as, for example, by recording the hash (the Merkle root) on the block in the blockchain. An energy block may subsequently be validated, for example, by using the root hash to load the Merkle trie at two different states to prove the change (e.g., addition or consumption of energy) claimed by the energy block. For example, when an energy data record is added to a Merkle trie, it indexes the identifying key of the record. In various embodiments, the key is the hash of the data. Accordingly, the energy data is stored in an efficiently scalable, rapidly processed, verifiable data structure.

In various embodiments, the combination of Merkle trie and blockchain may provide significant advantages in scalability and processing. For example, implementations attempting to store large amounts of data on a blockchain may be secure and traceable, but may not be scalable (e.g., to large amounts of data) or feasible (e.g., real-time processing required, for example, by regional, national, and international energy distribution networks). Implementations attempting to operate without blockchains may, for example, sacrifice security and immutability. Implementations attempting to limit the amount of data stored to improve efficiency and scalability may, for example, truncate or eliminate underlying data records and so sacrifice traceability of each energy quanta to the underlying data records from generation through transmission to consumption. Accordingly, various embodiments may, for example, advantageously provide critical technological solutions associated with immutably and verifiably recording and processing energy data over large-scale networks.

For example, energy quanta may be represented in a secure, immutable blockchain. The blockchain may be scalable and efficient because the data contains hashes instead of the actual data records. However, the actual data records may be verifiable and traceable via the Merkle trie (hash of hashes) structure which may securely and traceably enable verification of each data record through hashes of the data itself. Because the Merkle trie stores hashes of the data, the Merkle trie itself may be scalable and efficient. Accordingly, a verifiable and immutable record may be advantageously created which is capable of validating and tracking the underlying energy data records, without requiring that the full data records are continuously stored and processed on the blockchain. In various embodiments, the advantages may, for example, be amplified as the scale of the network is increased. Accordingly, the system may be advantageously implemented across large-scale energy tracking and processing networks to solve existing technological problems in tracking and processing energy generation, transmission, and consumption records securely, verifiably, and immutably.

Although various embodiments have been described with respect to energy generation, energy generation data records, and creating associated energy blocks therefrom, other embodiments are possible. By way of example and not limitation, various embodiments are not limited to "energy" data. Various such embodiments may, for example, generate a secure and verifiable data record representing at least one measurable physical phenomena over a defined period of time. The data records may include data emitted by one or more meters relating to the same physical phenomena. Examples of such phenomena include energy-related resources, environmentally or climate related physical phenomena, other physical phenomena, or some combination thereof. By way of example and not limitation, physical phenomena may include: quanta of natural gas extracted, consumed, refined, or transmitted; quanta of oil extracted, refined, consumed, or transmitted; quanta air quality per period of time; quanta of people on one or more sites over a period of time (e.g., as measured by one or more 'occupancy meters'); other appropriate physical phenomena; or some combination thereof.

In various such embodiments, data records may be received from one or more meters measuring the physical phenomena at one or more associated situses. The data may be extracted and transformed into at least one predetermined data structure. At least some of the transformed data may be hashed and recorded in at least one trie. The hashed data records may be aggregated into a predetermined physical phenomena quantum which may, for example, be predetermined according to one or more data types or units of measure being produced by the one or more meters producing the data records. Various digital physical phenomena data assets, and derivatives thereof, may be generated and recorded (e.g., on one or more blockchains) with one or more associated Merkle trie roots. Accordingly, various embodiments may, for example, provide for secure, immutable, and verifiable recordation and generation of associated digital data assets for a variety of physical phenomena.

In various embodiments, energy quanta may, for example, be described in units of energy quantum per unit time (e.g., MWh), or in energy quanta (e.g., barrels of oil). Although various embodiments have been described in relation to energy generation, other implementations are possible. Various embodiments may implement energy quanta tracking and validation in the context of, by way of example and not limitation, electricity (e.g., renewable, traditional), natural gas, oil, other petroleum products, other energy commodity, or some combination thereof. Appropriate units may, by way of example and not limitation, include British thermal units (BTUs), gallons, barrels (bbls) of oil, other appropriate energy-related unit, or some combination thereof.

In various embodiments, energy quanta may be aggregated (e.g., such as is described elsewhere herein), by way of example and not limitation, as MMBTUs (million BTUs), 10,000 MMBTUs (e.g., the size of a Nymex natural gas contract), 50,000 bbls (e.g., the size of a Nymex oil contract), or other appropriate predetermined aggregation. In various embodiments predetermined aggregation units may, for example, be determined for convenience. In various embodiments, predetermined aggregation units may, for example, be determined according to a pre-existing aggregate unit (e.g., a common contractual unit such as may, by way of example and not limitation, be used on a commodity exchange).

Various embodiments may, by way of example and not limitation, be configured to process, track, and verify physical phenomena such as air quality over time. Units may, for example, be a predetermined metric of air quality. Aggregation may, by way of example and not limitation, be aggregated into hourly blocks, daily blocks, another predetermined time block, predetermined non-time block, or some combination thereof. Such embodiments may, for example, advantageously provide immutable and verifiable digital air quality data assets. The data assets may be used, by way of example and not limitation, to enrich other energy blocks (e.g., energy generation or consumption), in trading, other suitable uses, or some combination thereof.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the memory can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations. In various embodiments, a processor may include multiple co-processors cooperating to execute a program of instructions in a coherent way to perform one or more functions. The co-processors may, by way of example and not limitation, be implemented in a single hardware unit, may be implemented in a single location, may be implemented across multiple hardware units, may be implemented across a plurality of locations remote from each other, or some combination thereof.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

The invention claimed is:

1. A computer program product comprising:
at least one non-transitory computer readable medium storing a program of instructions wherein, when the instructions are executed on at least one processor, the at least one processor causes operations to be performed to verify energy generation, transmission, and consumption across at least one tracking and processing infrastructure, the operations comprising:
  generating a hash value for each of a plurality of energy generation data records (EGDRs), each representing a defined quantity of energy produced in a defined time period;
  storing each hash value in a Merkle trie;
  generating an aggregate of at least one of the EGDRs for a predetermined quantum of energy represented by the aggregate of at least one of the EGDRs;
  generating an energy block on at least one blockchain and storing therein at least one root hash value, the at least one root hash value representing a root in the Merkle trie corresponding to the aggregate of at least one of the EGDRs; and
  associating the energy block with energy validation data (EVD) relating to scheduling, delivery, and consumption corresponding to the predetermined quantum of energy.

2. The computer program product of claim 1, the operations further comprising generating at least one digital asset token corresponding to the energy block and based on a function of both the aggregate of at least one of the EGDRs and the EVD.

3. The computer program product of claim 2, wherein the at least one digital asset token comprises a digital renewable energy certificate.

4. The computer program product of claim 2, wherein the at least one digital asset token comprises a digital energy efficient credit.

5. The computer program product of claim 2, wherein the at least one digital asset token comprises a $CO_2$ allowance.

6. The computer program product of claim 2, wherein the at least one digital asset token comprises a $CO_2$ liability.

7. The computer program product of claim 1, the operations further comprising:
  retrieving first energy generation data originating from a first physical generation facility; and
  generating one or more corresponding EGDRs therefrom by performing extract, transform, and load operations on the retrieved first energy generation data according to at least one predetermined data structure.

8. The computer program product of claim 1, the operations further comprising:
  retrieving first energy consumption data originating from a first physical energy consumption facility;
  updating the EVD according to the retrieved first energy consumption data; and
  generating an updated energy block associated therewith by performing extract, transform, and load operations on the EVD according to at least one predetermined data structure.

9. The computer program product of claim 1, the operations further comprising:
  retrieving first energy scheduling data from a first energy transmission facility;
  updating the EVD according to the first energy scheduling data; and
  generating an updated energy block associated therewith by performing extract, transform, and load operations on the EVD.

10. The computer program product of claim 1, the operations further comprising:
  retrieving first energy delivery data from a first energy transmission facility;
  updating the EVD according to the first energy delivery data; and
  generating an updated energy block associated therewith by performing extract, transform, and load operations on the EVD.

11. The computer program product of claim 1, wherein the at least one tracking and processing infrastructure is configured to span at least one supra-municipality power grid.

12. The computer program product of claim 1, wherein at least one of the plurality of EGDRs originates on a first power grid and the EVD related to consumption originates on a second power grid, wherein there is a grid boundary interface between the first power grid and the second power grid.

13. The computer program product of claim 1, wherein the predetermined quantum of energy is one megawatt-hour.

14. The computer program product of claim 1, wherein the Merkle trie comprises one or more leaf nodes that each comprise a hash of one of the plurality of EGDRs.

15. The computer program product of claim 1, the operations further comprising validating the energy block by a function comparing the at least one root hash value of the energy block with a first root of the Merkle trie associated with a first time associated with the energy block.

16. The computer program product of claim 15, wherein the function further compares the at least one root hash value of the energy block with a second root of the Merkle trie associated with a second time associated with the energy block.

17. The computer program product of claim 16, wherein:
  the Merkle trie comprises one or more leaf nodes associated with the energy block,
  each of the one or more leaf nodes comprises a hash of one of the plurality of EGDRs, and
  the function further validates the energy block based on at least one of the one or more leaf nodes of the Merkle trie associated with the energy block.

18. A computer-implemented method performed by at least one processor to verify energy generation, transmission, and consumption across at least one tracking and processing infrastructure, the method comprising:
  generating a hash value for each of a plurality of energy generation data records (EGDRs), each representing a defined quantity of energy produced in a defined time period;
  storing each hash value in a Merkle trie;
  generating an aggregate of at least one of the EGDRs for a predetermined quantum of energy represented by the aggregate of at least one of the EGDRs;
  generating an energy block on at least one blockchain and storing therein at least one root hash value, the at least one root hash value representing a root in the Merkle trie corresponding to the aggregate of at least one of the EGDRs; and
  associating the energy block with data relating to scheduling, delivery, and consumption corresponding to the predetermined quantum of energy.

19. The computer-implemented method of claim 18, the method further comprising:
  retrieving energy generation data originating from at least one physical generation facility; and
  generating one or more corresponding EGDRs therefrom by performing extract, transform, and load operations according to at least one predetermined data structure.

20. The computer-implemented method of claim 18, the method further comprising validating an energy block by at least one function comparing together a first root of the Merkle trie associated with a first time associated with the energy block, a second root of the Merkle trie associated with a second time associated with the energy block, and at least one leaf node of the Merkle trie associated with the energy block.

\* \* \* \* \*